Sept. 5, 1967  J. D. AINSWORTH  3,340,432
ELECTRIC CIRCUIT FOR DETECTING FAULTS
IN CAPACITORS IN POWER SYSTEMS
Filed June 2, 1964  3 Sheets-Sheet 1

United States Patent Office 3,340,432
Patented Sept. 5, 1967

3,340,432
ELECTRIC CIRCUIT FOR DETECTING FAULTS IN CAPACITORS IN POWER SYSTEMS
John Desmond Ainsworth, Stafford, England, assignor to The English Electric Company Limited, London, England, a British company
Filed June 2, 1964, Ser. No. 371,913
Claims priority, application Great Britain, June 5, 1963, 22,459/63
7 Claims. (Cl. 317—12)

The invention relates to circuit arrangements for detecting variations in capacitance in a capacitor circuit connected in shunt relationship with an alternating current power supply system for, for example, power factor correction or harmonic filtering.

According to the invention, a circuit arrangement for detecting variation in the capacitance of a capacitor circuit connected in shunt relationship with an alternating current power supply system, comprises detecting means for detecting changes from a normal value in the current through the capacitor circuit.

Preferably, the said detecting means comprises comparing means for comparing a first signal dependent on the magnitude of the actual current through the capacitor circuit with a reference signal dependent on the magnitude of the current which flows through the capacitor circuit when the latter has its nominal value of capacitance, and output means operative when the comparison indicates a variation from the nominal value of the capacitance of the capacitor circuit to produce a signal indicative of the variation.

In an embodiment of the invention for use with a capacitor circuit connected to a single phase power supply system, the comparing means includes a current transformer responsive to the current through the capacitor circuit for producing in a first circuit a dependent current constituting the said first signal, means responsive to the voltage across the capacitor circuit for producing in a second circuit a dependent current constituting the said reference signal and means for comparing the currents in the first and second circuits.

Preferably, the means for comparing the currents in the first and second circuits comprises means for interconnecting the first and second circuits and a series auxiliary capacitor in one of the first and second circuits, the first and second circuits being so interconnected and the series auxiliary capacitor having such a value that normally the respective currents flowing in the first and second circuits are equal and in anti-phase, the said output means comprising relay means responsive to divergence between the currents in the first and second circuits caused by variation in capacitance of the capacitor circuit for producing the said output signal.

Advantageously, the said means responsive to the voltage across the capacitor circuit is a voltage transformer having its primary circuit connected across the capacitor circuit and its secondary circuit connected to supply the said second circuit.

According to a feature of the invention, in a circuit arrangement for use with a plurality of capacitor circuits connected in shunt to a polyphase power supply system, the detecting means comprises comparing means for comparing a first signal dependent on the vector sum of the actual currents through the capacitor circuits with a reference signal dependent on the vector sum of the currents which flow through the capacitor circuits when the latter have their nominal values of capacitance, and output means operative when the comparison indicates a variation from the nominal value of the capacitance of one or more of the capacitor circuits for producing an output signal indicative of the variation.

Preferably the reference signal is also dependent on the vector sum of the phase voltages of the power supply system whereby to compensate for changes in current through the capacitor circuits arising from changes in the vector sum of the voltages.

In an embodiment of the invention, the capacitor circuits being respectively connected between the lines of the power supply system and the neutral point, the comparing means includes a current transformer responsive to the total current flowing to the neutral point from all the capacitor circuits for producing in a first circuit a dependent current constituting the said first signal, means responsive to the vector sum of the phase voltages of the power supply system for producing in a second circuit a dependent current constituting the said reference signal, and means for comparing the currents in the first and second circuits.

Preferably, the means for comparing the currents in the first and second circuits comprises means for interconnecting the first and second circuits and series auxiliary capacitance means in the second circuit, the first and second circuits being so interconnected and the series auxiliary capacitance means having such a value, that, when the currents in the first and second circuits are not both zero, normally the currents in the first and second circuits are equal and in anti-phase irrespective of whether or not the voltages of the polyphase system remain balanced, the said output means comprising relay means responsive to divergence between the currents in the first and second circuits caused by variation in capacitance of one or more of the capacitor circuits for producing the said output signal.

Advantageously, the said means responsive to the vector sum of the phase voltages is a polyphase voltage transformer having its primary circuit connected to respond to the phase voltages of the power supply system and its secondary circuit connected to supply the said second circuit.

If the power supply system is a three-phase system, the secondary circuit may comprise three star-connected windings each connected in series with a capacitor, the three capacitors constituting the said series auxiliary capacitance means.

In another arrangement, the secondary circuit of the transformer comprises three windings connected in open-delta configuration and in series with a single capacitor constituting the said series auxiliary capacitance means.

Impedance means may be provided in addition to the said series auxiliary capacitance for compensating for the effect of loss components in the capacitance circuits.

As used herein, the term "polyphase power supply system" means a power supply system with more than two phases.

Various circuit arrangements according to the invention for detecting variations in the capacitance of, and for protecting, capacitor circuits connected in shunt relationship with high voltage A.C. power supply systems will now be described by way of example and with reference to the accompanying drawings, in which.

Figure 1:
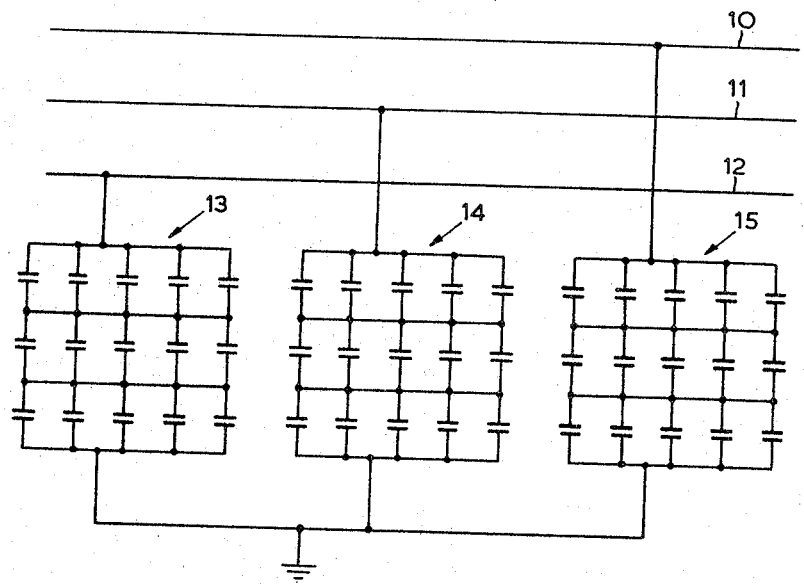
FIG. 1 shows a circuit diagram of an arrangement of capacitors forming such capacitor circuits or shunt-capacitor banks.

Referring now to the drawings, FIG. 1 shows a three-phase power supply system having three lines 10, 11 and 12 each connected to earth through a capacitor circuit or shunt-capacitor bank 13, 14 or 15. Each shunt-capacitor bank is built up from a number of individual capacitors connected in a series-parallel arrangement. It will be appreciated that if a capacitor becomes short circuited due to an internal fault, the other parallel connected capacitances will discharge through it and there may follow a complete failure of the bank which includes the faulty capacitor. Each capacitor may be fitted with a protecting fuse but blowing of a fuse raises the voltage and current of the remaining capacitors increasing the risk of further damage. Due to the large number of such fuses required, arranging fault indication is difficult.

Figure 2:
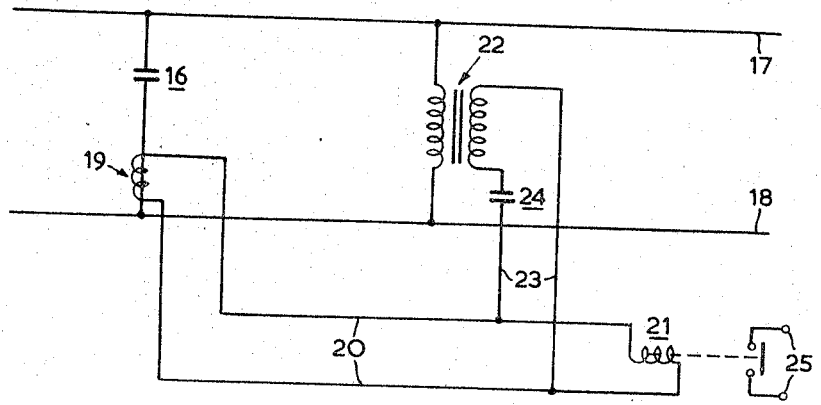
FIG. 2 shows a circuit diagram of one circuit arrangement according to the invention for use with a single phase power supply system.

FIG. 2 shows a high voltage single phase power supply system with a shunt capacitor bank 16, of similar form to those shown in FIG. 1, connected between a line conductor 17 and a neutral conductor 18. The current through the shunt-capacitor bank 16 is monitored by current trnasformer 19 whose secondary winding is connected by the circuit 20 to a relay coil 21. A primary winding of a voltage transformer 22 is connected between the line conductor 17 and the neutral conductor 18 and a secondary winding of the transformer supplies, through a circuit 23 and a capacitor 24, the relay coil 21.

The value of the capacitor 24 is chosen so that taking into account the turns ratios of the current and voltage transformers, the magnitudes of the currents in the circuits 20 and 23 are equal and in antiphase when the capacitor bank 16 has its nominal value of capacitance, and so no current flows to the relay coil 21. If the capacitance of the shunt capacitor bank 16 varies due to one or more protecting fuses blowing, for example, then the currents in the two circuits will no longer be equal and the relay coil will be energized by a net current flow from circuits 20 and 23 giving a fault indication signal by completion of a circuit between a pair of terminals 25 and, if required, may operate a circuit breaker (not shown) through which the bank is connected to the power supply system. The relay may be adjusted to be operated when its current is, say 1% of the current flowing in the secondary winding of the current transformer 19 when the capacitance of the bank 16 has its nominal value, if the bank has, say 50 capacitors.

Figure 3:
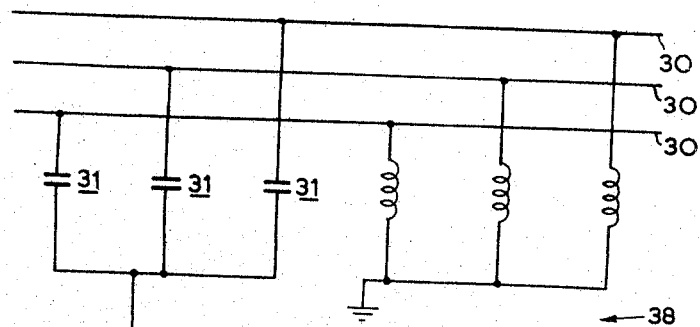
FIG. 3 shows a circuit diagram of another circuit arangement according to the invention for use with a three-phase power supply system.
Figure 3:
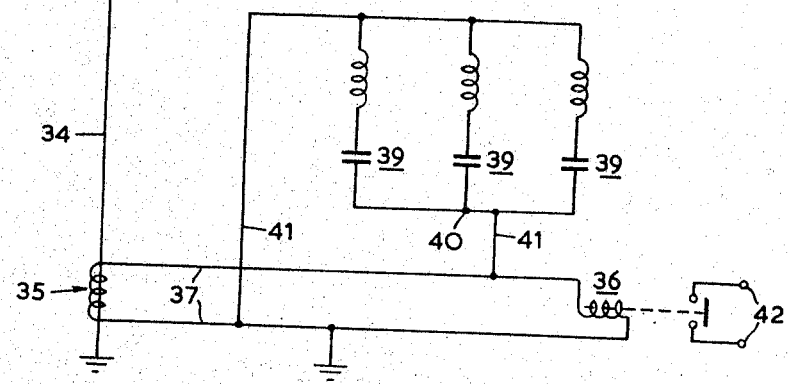
Figure 4:
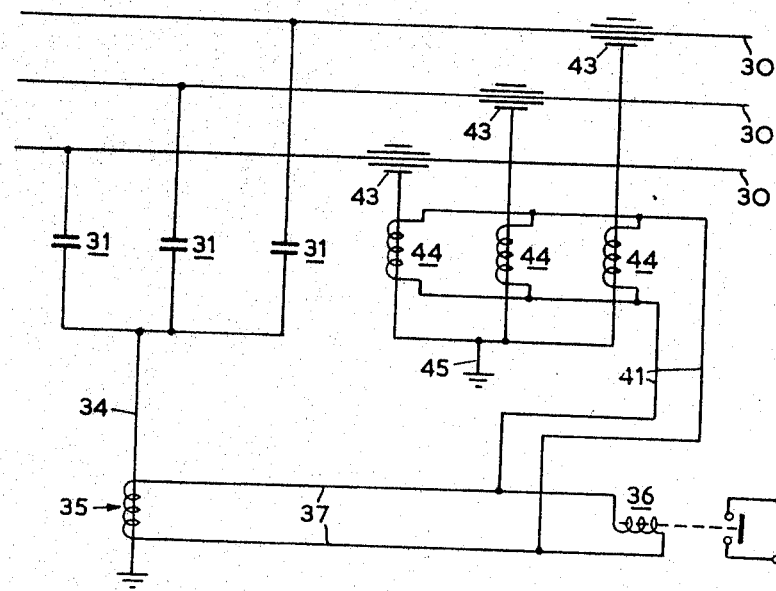
FIGS. 4 and 5 show circuit diagrams of further circuit arrangements according to the invention for use with a three-phase power supply system.
Figure 5:
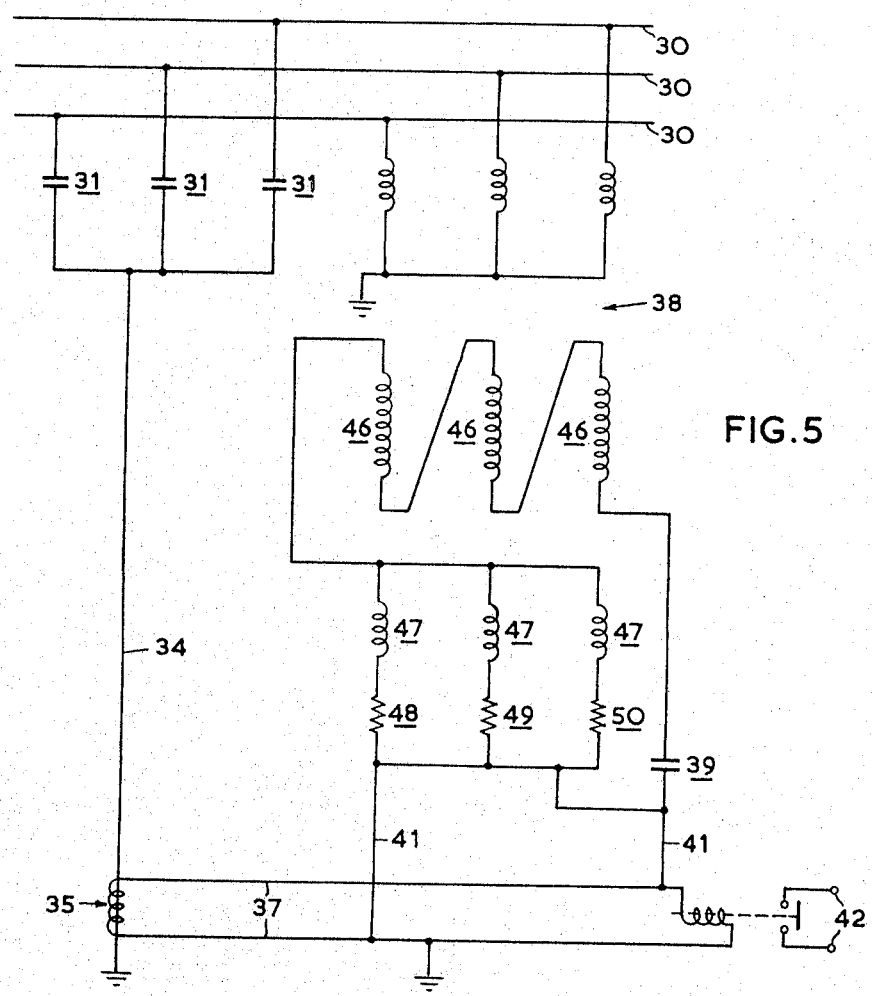

In a three-phase system with a capacitor bank 16 connected to neutral from each phase, three separate circuits similar to that illustrated in FIG. 1 may be used. In this case the capacitance of the three capacitors 24 may be individually adjusted to take account of any inequalities in the capacitances of the bank 16. FIGS. 3, 4 and 5 show alternative arrangements.

In FIG. 3, a three-phase power supply system having three lines 30 has three shunt-capacitor banks 31 each connected between a respective one of the lines 30 and a common earthed neutral connection 34. A current transformer 35 monitors the neutral current from the capacitor banks and feeds a relay coil 36 through a circuit 37. A three-phase star-connected voltage transformer 38 monitors the voltages on the lines 30, and its star-connected secondary windings supply current to a star-connected arrangement of capacitors 39, the star point of the secondary windings being connected to the star point of the capacitor arrangement through the relay coil 36.

In operation, with the values of the capacitor banks 31 equal and the phase voltages balanced, no current flows through the neutral connection 34 and hence no current will flow in the circuit 37. Similarly, with the values of the capacitances 39 equal, and the phase voltages balanced, no current will flow through the circuit 41. The relay will thus be inoperative. If the voltage system on the lines 30 becomes unbalanced a current will then flow through the neutral connection 34 causing a proportionate current to flow in the circuit 37. However, the values of the capacitors 39 are such that, taking into account the values of the turns ratios of the current transformer 35 and the voltage transformer 38, a similar current but in anti-phase, will flow in the circuit 41, so that the relay will still remain inoperative. If, however, the capacitances of the capacitor banks 31 become unequal, due for example to blowing of protecting fuses, then a current will flow through the neutral connection and set up a proportionate current in the circuit 37 which will not be balanced by an equal current in the circuit 41. The relay will therefore be operated to produce warning or protective action as before by completion of a circuit between a pair of terminals 42.

Changes of temperature which affect all components equally will not cause false operation of the relay, and as shown above the circuit is not affected by unbalanced power supply voltages.

As before, the values of the capacitances 39 may be individually adjusted to take account of any inequalities in the nominal values of the capacitor banks 31.

FIG. 4 shows a circuit which is basically similar to that shown in FIG. 3 and similar parts are similarly referenced. The voltage transformer 38 and the capacitors 39 of FIG. 3 are replaced, however, by capacitors directly connected to the three lines 30 of the power supply system. These capacitors are illustrated as capacitor bushings 43. The circuit is also modified by the incorporation of current transformers 44 which are connected together for feeding the circuit 41.

The operation of the circuit is exactly similar to that of FIG 3 and again the relay is not operated if the voltages of the power supply system become unbalanced.

The current transformers 44, are not essential, it being possible to connect circuit 41 in the neutral connection, referenced 45. However, if the current transformers are fitted with tappings, they enable adjustment to be made for any inequalities in the nominal values of the capacitor bushings 43 and/or the nominal values of the capacitor banks 31.

The circuit shown in FIG. 2 may be modified in a manner analogous to that described above. A capacitor or capacitor bushing may be directly connected to the line 17 in place of the voltage transformer 22 and capacitor 24, the circuit 23 then being connected between this capacitor or capacitor bushing and the neutral 18. Alternatively, the circuit 23 may be supplied from a small current transformer, having tappings for initial adjustment of balanced condition, and having as its primary winding a connection from the capacitor or capacitor bushing to the neutral 18.

FIGURE 5 shows another circuit which is basically similar to FIGURE 3 and, again, similar parts are similarly referenced. The secondary circuit of the transformer 38 is modified by connecting the three windings 46 in open-delta configuration and only one capacitor 39 is used, instead of three capacitors as in the circuits of FIGS. 3 and 4. A second difference is the addition of further secondary windings 47 each connected in series with a resistor 48, 49 or 50. The operation of the circuit is similar to that of the circuits of FIGS. 3 and 4 and the relay is not operated if the voltages of the power supply system become unbalanced. The current contributed to the circuit 41 by the windings 47 is arranged, by suitable adjustment of resistors 48 to 50, to compensate for the effect of loss components in the main capacitor banks 31 and the voltage and current transformers.

In certain cases, for example in a high voltage D.C. transmission system, the shunt capacitor banks may include inductors and resistors tuned to various harmonic frequencies to form a filter bank. In such cases, any of the protection circuit arrangements described above may be used, the balancing capacitors 24, 39 or 43 being replaced by combinations of capacitances, inductors and resistors giving an equivalent impedance to that which is to be protected. Alternatively, since the shunt banks are usually predominently capacitive at fundamental frequencies, capacitors may be used as before in combination with series resistors, as in FIG. 5, to balance the loss components. Since the circuit is then, in normal conditions, balanced at one frequency only which may be the fundamental frequency, the relay must in this case incorporate a filter tuned to this frequency to avoid spurious operation. A time delay may be required to avoid spurious relay operation in transient conditions.

All the polyphase circuit ararngements (FIGS. 3, 4 and 5) may be modified by removing the connection between the three shunt-capacitor banks 31 and also removing the connection 34, and substituting three separate connections from the shunt-capacitor banks to the earth point, all these three connections passing through the secondary winding of the current transformer 35. The operation of the circuits is exactly the same as described, the instantaneous vector sum of the currents in the three connections through the current transformer being zero when the system is balanced and all shunt-capacitor banks 31 have the same capacitance. The current in each of the three connections can be considered as being compared with the current in a respective one of the secondary windings of the transformer 38 (FIGS. 3 and 5) or of the current transformers 44 (FIG. 4).

What I claim as my invention and desire to secure by Letters Patent is:

1. A circuit for detecting faults in a group of capacitors comprising
    a single bank of capacitors comprising all the capacitors in said group connected between line and neutral conductors in a power supply line,
    a first sensing device connected between said capacitor bank and the neutral conductor for developing a first signal having a magnitude proportional to the sum of the instantaneous currents through said capacitors,
    an auxiliary circuit connected between said conductors in parallel with said capacitors,
    a second sensing device for developing a second signal having a magnitude proportional to a predetermined instantaneous electrical quantity exhibited by said auxiliary circuit, said second sensing device having operating parameters such that said second signal bears a predetermined ratio to said first signal in the absence of a fault in said capacitors, and
    detector means for receiving said first and second signals and being responsive thereto to produce an output indicative of a fault upon the magnitude of said signals differing from said predetermined ratio, 2. A circuit according to claim 1, wherein said first and second signals are anti-phase currents, and the said operating parameters of the second sensing device are such that the first and second signals are equal in magnitude in the absence of a fault in said capacitors.

3. A circuit for detecting faults in capacitors comprising
    a single bank of capacitors connected between each line conductor and a neutral conductor in a polyphase power supply system,
    a current transformer having primary and secondary windings, said primary winding being connected in common to all the capacitor banks, between said capacitor banks and the neutral conductor, whereby said secondary winding has developed therein a signal dependent on the sum of the instantaneous currents flowing through said capacitor banks,
    a polyphase voltage transformer having primary and secondary windings, said primary windings being connected between corresponding line conductors and said neutral conductor whereby said secondary windings have developed therein signals dependent on the sum of the instantaneous rates of change of voltages across said capacitor banks, the contribution to said voltage-dependent signal by the rate of change of voltage across any one capacitor in the bank bearing a predetermined relationship to the corresponding contribution to said current-dependent signal by the current through that capacitor in the absence of a fault in any of said capacitor banks,
    capacitor means of lower rating than the capacitors in the said bank connected to the secondary windings of said voltage transformer, the operating parameters of said capacitor means and said secondary windings being such that said capacitor-voltage dependent signals and the capacitor-current dependent signals are in a predetermined ratio in the absence of a said fault, and
    detector means for receiving said voltage and current dependent signals and being responsive thereto to produce an output indicative of a fault upon said signals differing from said predetermined ratio.

4. A circuit according to claim 3, wherein said polyphase system is three-phase, the polyphase voltage transformer having three primary and secondary windings, and wherein said capacitor means comprises,
    a capacitor connected in series with each of said secondary windings, the three primary and secondary windings and the three capacitors being connected in star.

5. A circuit according to claim 3, wherein said polyphase system is three-phase, the polyphase voltage transformer having three said primary windings connected in star and three said secondary windings connected in open delta, and wherein said capacitor means comprises,
    a capacitor connected in series with, and common to, the said three secondary windings.

6. A circuit according to claim 5, comprising,
    impedance means connected to said secondary windings of the voltage transformer to compensate for loss components in said capacitor banks.

7. A circuit for detecting faults in capacitors comprising
    a single bank of capacitors connected between each line conductor and a neutral conductor in a polyphase power supply system,
    a current transformer having primary and secondary windings, said primary winding being connected in common to all the capacitor banks, between said capacitor banks and the neutral conductor, whereby said secondary winding has developed therein a first signal dependent on the sum of the instantaneous currents flowing through said capacitor banks,
    capacitive bushing means mounted around each line conductor,
    a polyphase current transformer having primary and secondary windings, said primary windings being connected between the bushings associated with corresponding line conductors and said neutral conductor whereby said secondary windings have developed therein second signals dependent on the currents through said bushings, the capacitive values of said bushings and the operating parameters of said polyphase current transformer being such that said first and second signals bear a predetermined ratio to one another in the absence of a fault in any of said capacitor banks, and detector means for receiving said first and second signals and being responsive thereto to produce an output indicative of a fault upon said signals differing from said predetermined ratio.

References Cited

UNITED STATES PATENTS

| | | | |
|---|---|---|---|
| 1,730,858 | 10/1929 | Marbury | 317—27 |
| 1,732,977 | 10/1929 | Mayr | 317—32 |
| 1,888,718 | 11/1932 | Friedlander | 317—27 |
| 3,143,687 | 8/1964 | Hjertberg | 317—12 |

FOREIGN PATENTS 82,856   12/1953   Norway.

MILTON O. HIRSHFIELD, *Primary Examiner.*

SAMUEL BERNSTEIN, *Examiner.*

R. V. LUPO, *Assistant Examiner.*